United States Patent
Rangan (10) Patent No.: US 6,434,570 B1
(45) Date of Patent: Aug. 13, 2002

(54) METHOD AND APPARATUS FOR ESTIMATING A PERCENTILE FOR A VALUE

(75) Inventor: Venkat Rangan, Fremont, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/140,358

(22) Filed: Aug. 26, 1998

(51) Int. Cl.⁷ .............................................. G06F 17/30

(52) U.S. Cl. .......................... 707/104; 707/7; 706/46; 706/56

(58) Field of Search .................. 707/100–104, 707/7; 706/56, 46

(56) References Cited

U.S. PATENT DOCUMENTS

| | | | |
|---|---|---|---|
| 5,542,089 A | * 7/1996 | Lindsay et al. | 707/2 |
| 5,870,748 A | * 2/1999 | Morimoto et al. | 707/101 |
| 5,870,752 A | * 2/1999 | Gibbsons et al. | 707/102 |
| 6,278,989 B1 | * 8/2001 | Chaudhuri et al. | 707/2 |

* cited by examiner

*Primary Examiner*—Kim Vu
*Assistant Examiner*—Jean Bolte Fleurantin
(74) *Attorney, Agent, or Firm*—Reginald J. Hill (57) ABSTRACT

A method and apparatus are described for computing the value at a given percentile of a population and the percentile of a given value in the population. In the described system, computing efficiencies are achieved by storing received values in "buckets" and performing percentile calculations based on values in the buckets.

9 Claims, 6 Drawing Sheets

METHOD AND APPARATUS FOR ESTIMATING A PERCENTILE FOR A VALUE

BACKGROUND OF THE INVENTION

1. Field of the Invention

The present invention relates to the field computation of statistics for populations and more specifically to computation of percentiles of samples of a given population which is changing over time.

2. Description of the Related Art

It is often interesting to be able to express, for a given sample of a population, its position in the population relative to other samples. Often this is expressed as a percentile. For example, if height measurements were taken of all the children in a particular grade school, the student who had as many children taller than him as shorter than him could be said to be in the $50^{th}$ percentile of the overall population. The population of students in a grade school is a relatively trivial example at least because the population is relatively static over time. If the population was rapidly changing (and, thus, the percentile ranking for each student changing), calculating the percentile for any particular sample becomes non-trivial especially as the rate of change approaches the time it takes to compute the percentile. Typically, computing the percentile of a sample requires obtaining a list of all samples and then sorting the list. This process, especially the sorting of large sets of samples, is compute intensive.

Thus, what is needed is an efficient method and apparatus for computing percentiles of samples of populations which change over time.

SUMMARY OF THE INVENTION

A method and apparatus for computing the value at a given percentile and the percentile of a given value is described. In the described system, computing efficiencies are achieved by storing received values in "buckets" and performing percentile calculations based on values in the buckets.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS OF THE PRESENT INVENTION

Overview

The present invention provides a computationally efficient method and apparatus for computing the percentile for a given sample in a population where the population changes over time. The invention may be particularly useful in environments where the population is changing relatively rapidly over time. For example, in data networking applications, it has been observed that round trip time measurements and server latency measurements do not follow conventional statistical distributions (such as Poisson or Gaussian). As a result, mean latency is generally not a good indicator of the typical behavior of a component in a network. It has been observed that a more appropriate measure of typical behavior is the median. And, the percentile of a given sample can be used to provide the probability that an observation of the sample size or less will be seen in the operation of the network. However, in network monitoring systems, data collection may be an ongoing process and, thus, the population is rapidly changing as new data is collected. As was discussed, in one prior art approach, a list of all samples may be maintained and sorted. When a new sample is observed, it is inserted into the appropriate location in the list (or the list is resorted). This is clearly computationally intensive for a rapidly changing population such as the gathering of statistics in a network monitoring system.

The present invention proposes maintaining the samples in a set of groups of "buckets". For example, a set of buckets of heights of people. Each bucket maintains a counter indicating the number of samples within that bucket.

The percentile ranking for any given sample can then be approximated by observing the count in the various buckets using the methods which will be described below.

Figure 1:
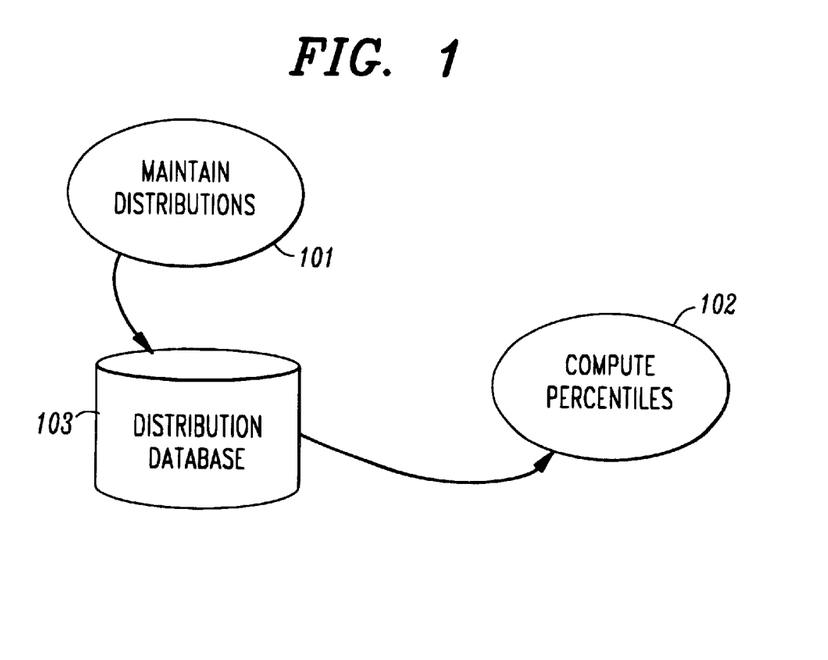
FIG. 1 is a diagram illustrating a conceptual level diagram of a system implementing an embodiment of the present invention.

FIG. 1 is a high level conceptual diagram of certain aspects of the present invention. The present invention maintains a distribution database 103 which maintains the counts for each "bucket". A process 101 initializes the buckets, receives samples and increments the bucket counters as appropriate for the samples received. This process will be described in greater detail below. A second process 102 computes percentiles for any given value or alternatively provides a value for any requested percentile.

Figure 2:
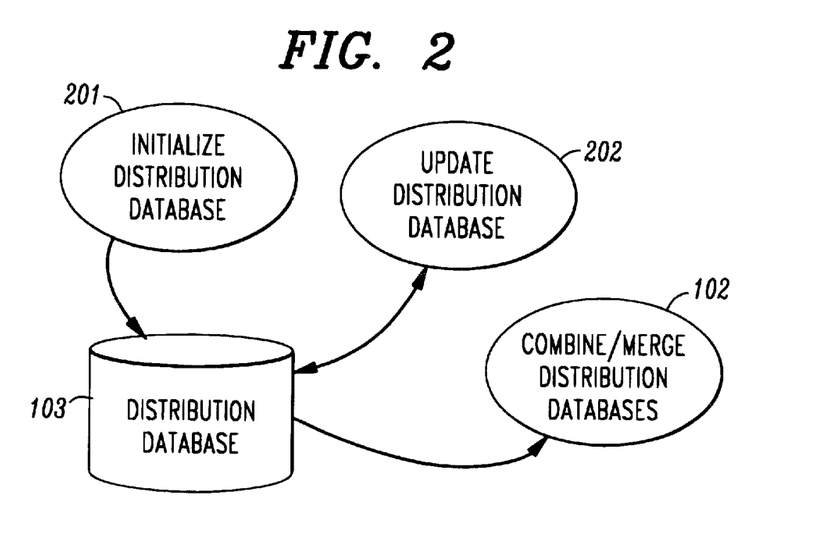
FIG. 2 is a diagram illustrating a conceptual level diagram of a system for maintaining distributions implementing an embodiment of the present invention.

FIG. 2 is a high level conceptual diagram further illustrating the process of maintaining distributions (block 101 of FIG. 1). There are three functions performed in maintaining distributions. The distribution database 103 is initialized by process 201. This will be described in greater detail in connection with FIG. 3A. The distribution database is updated as new samples are received by process 202. This will be described in greater detail in connection with FIG. 3B. Finally, the distribution database may be redistributed under certain condition or may be merged with other distribution databases by process 204. This will be described in greater detail by FIGS. 3C and 3D.

Initialization of a Distribution Database

Figure 3A:
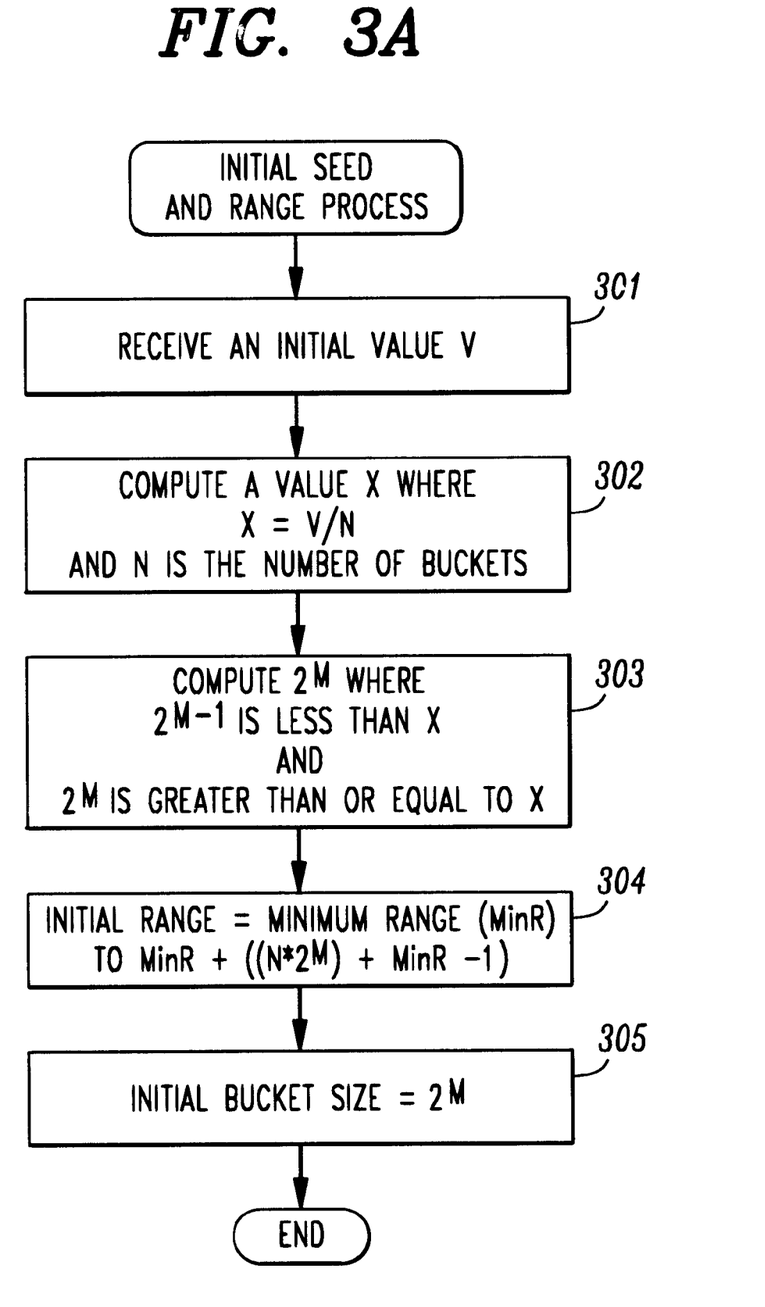
FIG. 3A is a flow diagram illustrating a method for seeding and computing "bucket" ranges as may be utilized by an embodiment of the present invention.

Turning now to FIG. 3A, a process for initialization of the distribution database is described. An initial value V is received for the initialization process, block 301. In the exemplary application in which student height measurements are distributed, the initial value V may be the height of the first student measured. In another exemplary application, in which network round trip time is measured and distributed, the initial value may be the first reported round trip time. Assume for purposes of our student height example that the first student is measured at 50 inches. Therefore V=50.

A value X is then computed, block 302, where:

$$X = V/N$$

Where N is the number of buckets to be used in the process, block 301. The number of buckets may be user selectable or may be set dependent on the application. An increased number of buckets leads to increased accuracy of the percentile estimates. However, it also increases the computational requirements. Assume for purposes of our example that N is 10. Thus, $$X = 50/10 = 5$$

The value X is then used to compute a value $2^m$, block 303, such that:

$$2^{m-1} < X \leq 2^m$$

Thus, in our example, $2^m$ is 8. It should be noted that using $2^m$ rather than X in the rest of the process leads to certain computational efficiencies which will be discussed in greater detail below. However, in certain embodiments, X may be used directly in place of $2^m$.

An initial range for the buckets is then computed as:

$$\text{Initial Range} = \text{MinR to } ((N * 2^m) + \text{MinR} - 1)$$

where MinR is the minimum range (which is typically user selectable or set dependent on the application), block 304. MinR is also selected to be the lower boundary of a range—e.g., in our example MinR might be 8 inches. In the described embodiment, it has been found that it is advantageous to set MinR to a value which is a power of 2.

The initial bucket size (BSIZE) is set to $2^m$, block 305. Thus, the initial range is from 8 inches to 87 inches and the 10 buckets will have ranges as shown in Table I:

TABLE I

| Bucket # | Lower limit of Range | Upper limit of range |
|---|---|---|
| 1 | 8 | 15 |
| 2 | 16 | 23 |
| 3 | 24 | 31 |
| 4 | 32 | 39 |
| 5 | 40 | 47 |
| 6 | 48 | 55 |
| 7 | 56 | 63 |
| 8 | 64 | 71 |
| 9 | 72 | 79 |
| 10 | 80 | 87 |

The initial value (50) is then placed in bucket 6.

Updating Distributions with New Values

Figure 3B:
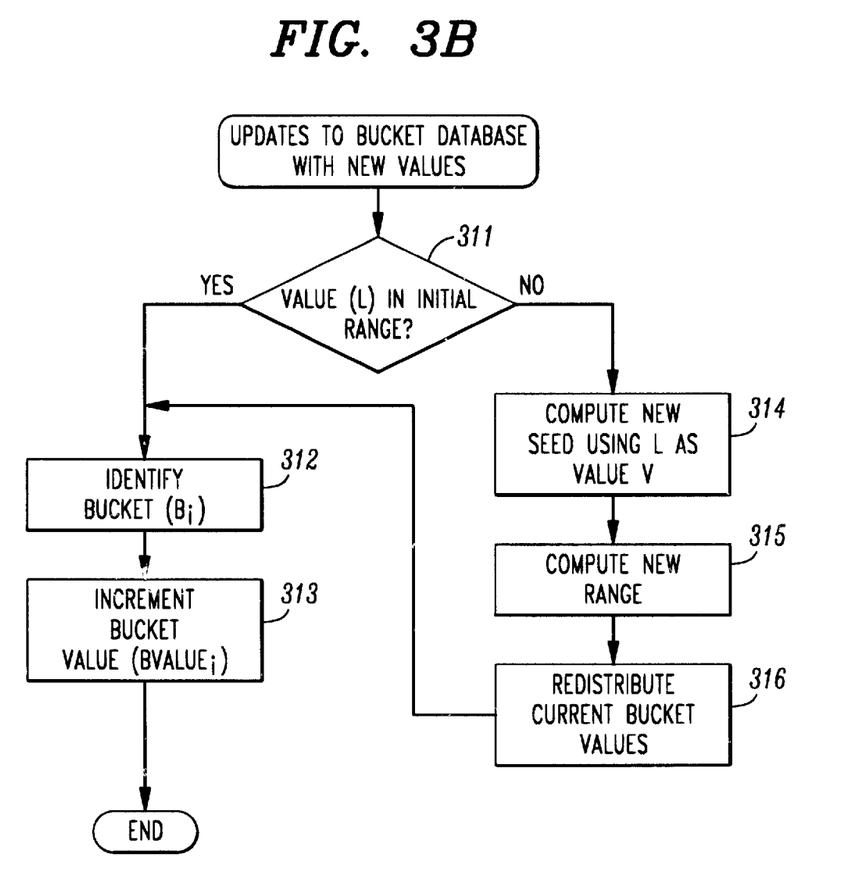
FIG. 3B is a flow diagram illustrating a method for updating the "buckets" with new values as may be utilized by an embodiment of the present invention.

Turning now to FIG. 3B, a process for updating the distribution database 103 with new values as they are received is described. Assume that a new value 42 is received. First, a check is done to determine if the new value is within the initial range, block 311. In this case, the value is well within the initial range and a bucket ($B_i$) is identified corresponding to the value, block 312. In the example, $B_i$ is bucket 5. The bucket value ($BVALUE_i$) for $B_i$ is incremented, block 313.

Redistributing Buckets

Assume that another new value is received which is outside the initial range. For example, assume that a value of 92 is received. New buckets are then computed and the values in the old buckets are redistributed to the new buckets as will now be described. First, the new value is used as the value V and X is recomputed as X=92/10=9.2, block 314. A new range and bucket sizes are then computed, block 315, as was described above (where $2^m$ is now 16). The new range is 8 to 167. The buckets ranges are as shown in Table II.

TABLE I

| Bucket # | Lower limit of Range | Upper limit of range |
|---|---|---|
| 1 | 8 | 23 |
| 2 | 24 | 39 |
| 3 | 40 | 55 |
| 4 | 56 | 71 |
| 5 | 72 | 87 |
| 6 | 88 | 103 |
| 7 | 104 | 119 |
| 8 | 120 | 135 |
| 9 | 136 | 151 |
| 10 | 152 | 167 |

Figure 3C:
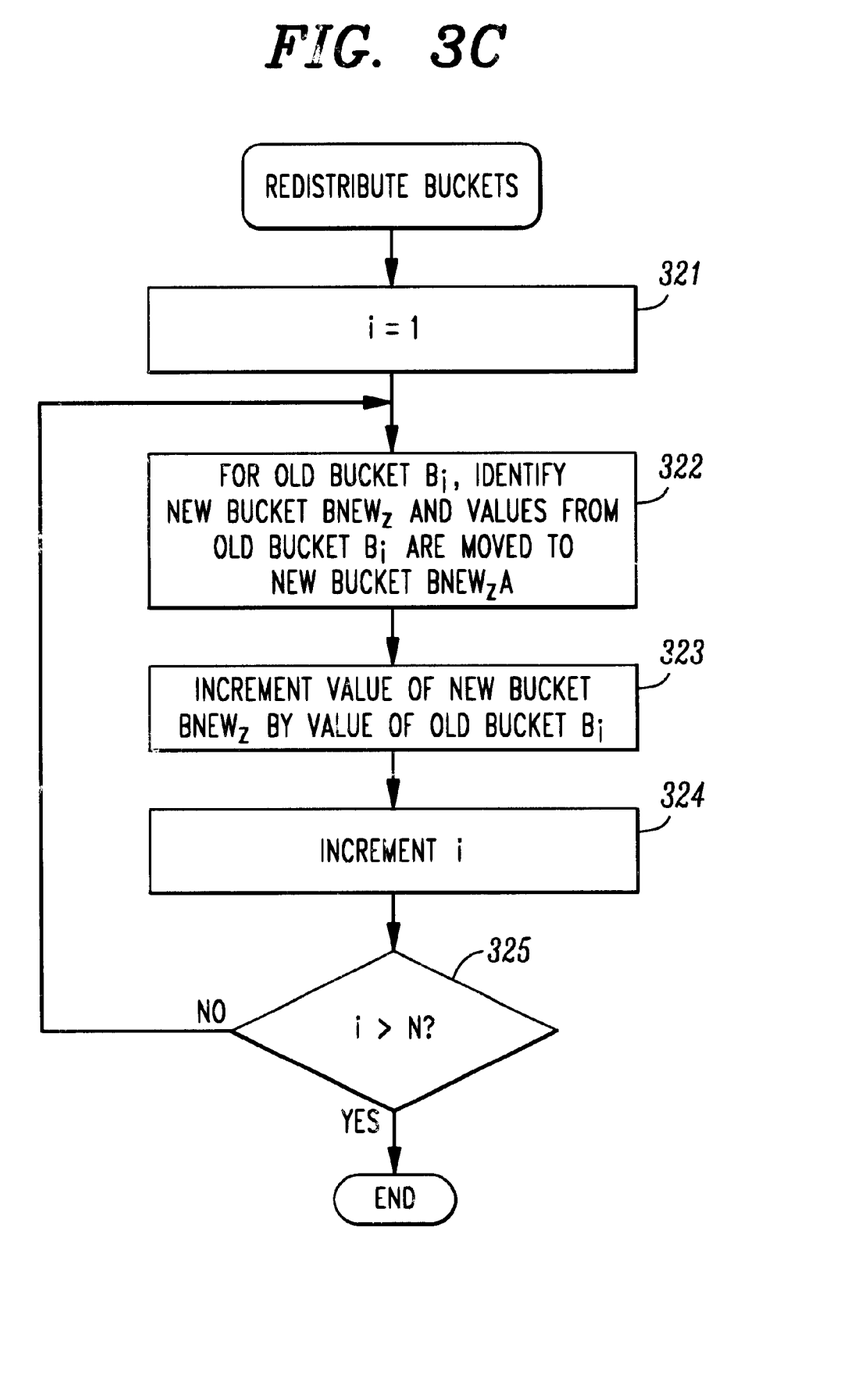
FIG. 3C is a flow diagram illustrating a method for redistribution of buckets as may be utilized by an embodiment of the present invention.

The values of the old buckets are then redistributed to the new buckets as is described in greater detail with reference to FIG. 3C. First, a value i is initialized to 1, block 321. Then for old bucket $B_i$, the corresponding new bucket $BNEW_z$ is identified, block 322. In our example, old bucket 1 corresponds to new bucket 1 (because old bucket 1's range of 8 to 15 fits within new bucket 1s range of 8 to 23). Old bucket 2 corresponds to new bucket 1, old bucket 3 corresponds to new bucket 2, etc. It will be appreciated that one advantage of using $2^m$ rather than X, to compute bucket ranges is that, all old bucket ranges fit within a single new bucket during the distribution process. Values from old bucket $B_I$ are moved to new bucket $BNEW_z$.

The BVALUE of new bucket $BNEW_z$ is then incremented by the value of old bucket $B_I$, block 323 and i is incremented, block 324 and the process is repeated until i is greater than N (the number of buckets), block 325.

Merging Distributions

It may be useful to be able to merge distributions. For example, in some applications such as network monitoring, distributions may be maintained to cover a certain time span. For example, a distribution may be maintained for each hour and it may be desirable to merge the 24 hourly distributions in order to provide a daily distribution.

Figure 3D:
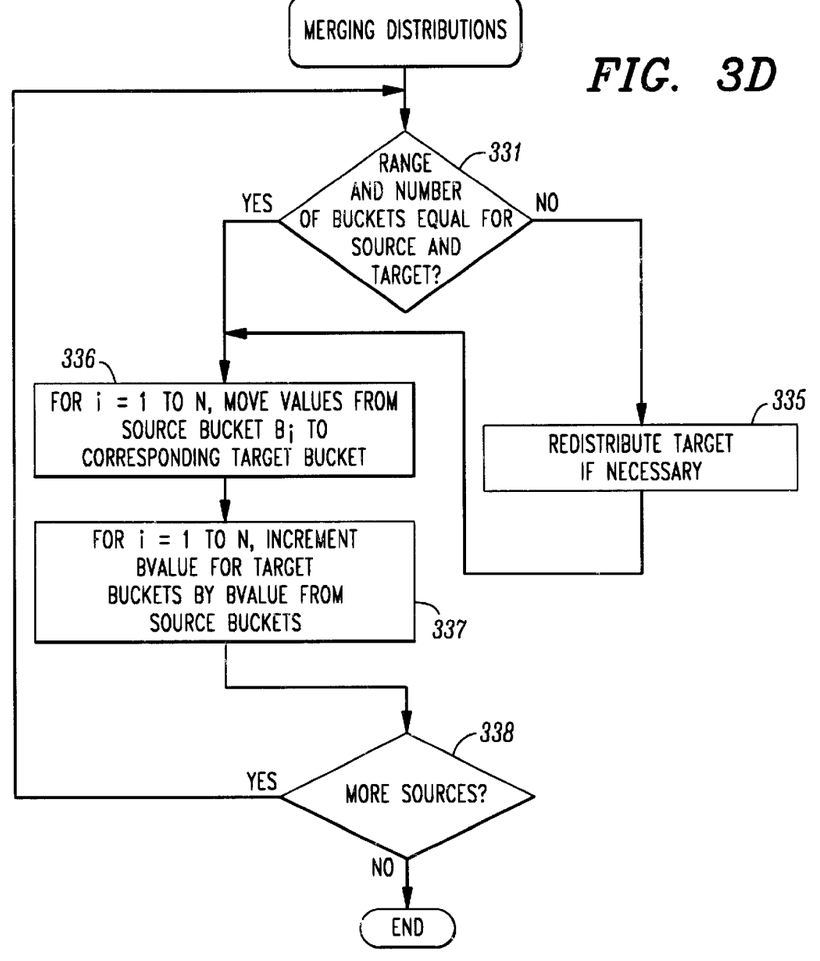
FIG. 3D is a flow diagram illustrating a method of merging distributions as may be utilized by an embodiment of the present invention.

In order to merge distributions, initially one distribution database 103 is designated as a source distribution database and an other is designated as a target distribution database. A check is made to determine if the minimum value (MinR), range and number of buckets in the source and the target are equal, block 331.

If they are not equal, a check is made of whether it is necessary to redistribute the target distribution database, block 335. The target distribution database must be redistributed if its range does not at least span the full range of the source distribution database. The process for redistributing the target database are described in FIG. 3B, blocks 314–316 with V being equal to the highest end point in the last bucket in the source distribution.

After completing the redistribution (if necessary), bucket, the values from each of the source buckets are moved to the corresponding target buckets, block 336. The corresponding target bucket is the target bucket which covers the range of the source bucket (note that at this stage of the process, source bucket ranges will always fit within exactly one target bucket).

The BVALUE for the target buckets is also incremented by the BVALUE for the source bucket, block 337.

If the range and number of buckets for the source and distribution were equal, the process is simplified because the source bucket $B_i$ corresponds to target bucket $B_i$.

If there are more source distributions to be merged (e.g., 23 more hours in the day), the process is repeated for each source distribution, block 338.

Computing Percentiles

What has been described thus far is how distributions are maintained. Two questions of interest may be asked:

1) For a given percentile (P), what is the value? (e.g., what is the height of someone at the $50^{th}$ percentile of the population?)

2) For a given value (J), what is the percentile? (e.g., if someone is 72 inches tall, what percentile of the population is the person in?)

Figure 4A:
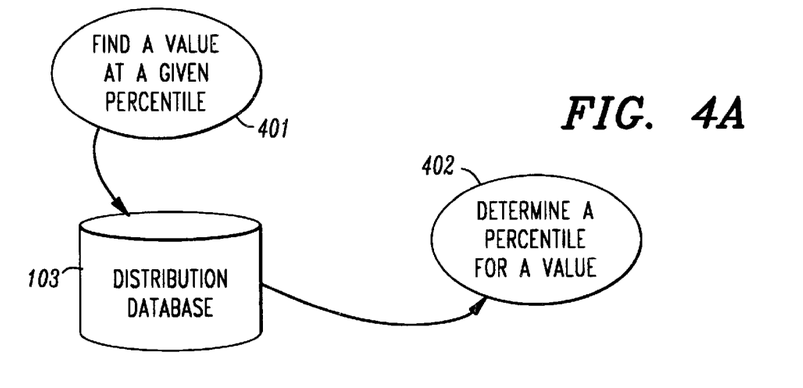
FIG. 4A is a diagram illustrating a conceptual level diagram of processes for computing percentiles and values at given percentiles.

As is illustrated by FIG. 4A, a process for answering the first question is described in connection with FIG. 4B and a process for answering the second question is described in connection with FIG. 4C.

Figure 4B:
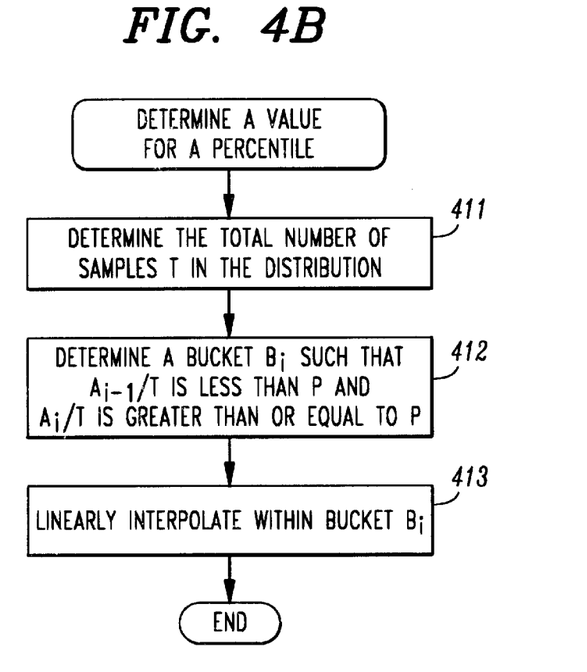
FIG. 4B is a flow diagram illustrating a method for finding values at a given percentile.

Turning first to FIG. 4B, the total number of samples T in the distribution is determined, block 411. In certain embodiments, a total sample count is simply kept as samples are received by incrementing and saving a counter. In an alternative embodiment, the total sample count may be computed when queries are made on the distribution database by accumulating the counts for each of the individual buckets.

The bucket in which the desired percentile is found is determined, block 412, by accumulating the counts from each bucket ($BVALUE_i$), starting at bucket 1 until P is greater than or equal to the accumulated count ($A_i$). In other words:

$$A_{i-1}/T < P \leq A_i/T$$

The desired value is within bucket $B_i$. In the described embodiment, linear interpolation, block 413, is then used to compute a particular value within the bucket. For example, if P=$48^{th}$ percentile and bucket $B_I$ was determined to include values from the $43^{nd}$ percentile to the $52^{nd}$ percentile (i.e., $A_{i-1}$=43 and $A_i$=52), the value that is chosen is the mid-value in the bucket. As will be appreciated, this method provides an estimation of the percentile value and not necessarily the exact value. However, for purposes of many calculations, an estimate is sufficient and worth the reduction in computing resources required for calculation by using the described method.

Figure 4C:
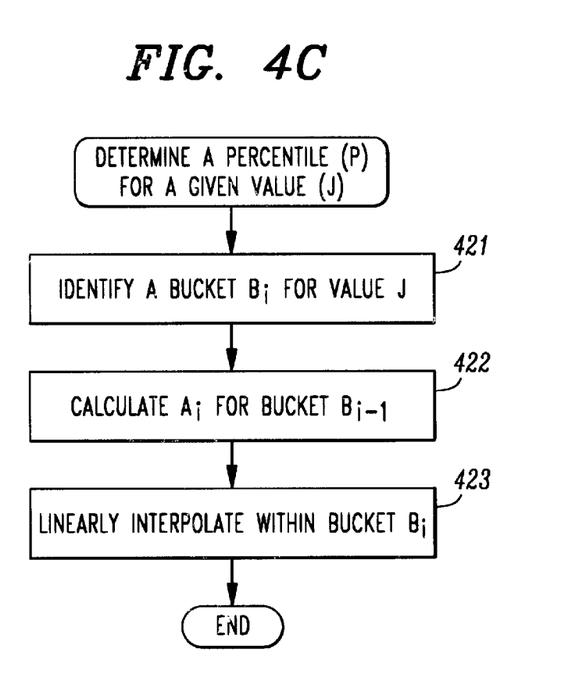
FIG. 4C is a flow diagram illustrating a method for determining the percentile for a given value.

Turning now to the second question and with reference to FIG. 4C, initially, the bucket $B_i$ which includes the desired value J is identified, block 421.

Next, the lower percentile boundary $A_i/T$ for the bucket $B_I$ is calculated as was described in connection with FIG. 4B, block 422.

Finally, linear interpolation is used to determine the position in the bucket $B_I$ of the desired value J and the percentile value is calculated as:

$$A_i/T + \text{linearly interpolated value.}$$

For example, if $A_i/T$ is 43 and the linearly interpolated value shows that the value J falls at the mid-point of the bucket $B_I$ and if bucket $B_I$ covers values from the $43^{rd}$ to $52^{nd}$ percentiles, then the value J represents the $48^{th}$ percentile.

Thus, what has been described is a method and apparatus for estimating a percentile for a value and a value for a percentile.

What is claimed is:

1. A method of computing percentiles for values in a population and values for percentiles of a population comprising:

maintaining at least one set of buckets containing values as values are received by a processing system, wherein the step of maintaining buckets comprises:
  a) initializing the buckets, comprising:
    i) receiving an initial value V;
    ii) computing a value X where X=V/N and N is the number of buckets, wherein N is selected by one of a user and the processing system;
    iii) computing a value $2^m$ based on the value X, wherein $2^{m-1}$ is less than X and $2^m$ is greater than or equal to X;
    iv) computing an initial range for the buckets, comprising:
      selecting a minimum value of the initial range, wherein the minimum value is selected by one of a user and the processing system; and
      computing a maximum value of the initial range where the maximum value=$((N \cdot 2^m) + (\text{minimum value} - 1))$;
    v) setting an initial size for the buckets to $2^m$; and
  b) placing the initial value V and new values in the buckets based on the initial range and the initial size of the buckets; and
computing percentiles for values and values for percentiles based on the initial value V and the new values in the buckets, wherein the initial value V and the new values relate to time measurements in a network.

2. The method as recited in claim 1 wherein N is user selectable.

3. The method as recited in claim 1, further comprising the step of:
  c) redistributing the values to a new set of buckets upon reception of a value $V_{new}$ not within the initial range of the buckets, redistributing comprising:
    determining a configuration for the new set of buckets, comprising the steps of:
      computing a value $X_{new}$ where $X_{new}=V_{new}/N$;
      computing a value $2^m{}_{new}$ where $2^{m-1}{}_{new}$ is less than $X_{new}$ and $2^m{}_{new}$ is greater than or equal to $X_{new}$;
      setting a new size bucket size to $2^m{}_{new}$; and
      computing a new range of values for the new set of buckets.

4. The method as recited in claim 3 wherein the step of redistributing the values to new buckets comprises:
  determining a configuration for the new set of buckets comprising the steps of:
    computing a value $X_{new}$ where $X_{new}=V_{new}/N$;
    computing a value $2^m{}_{new}$ where $2^{m-1}{}_{new}$ is less than $X_{new}$ and $2^m{}_{new}$ is greater than or equal to $X_{new}$;
    setting a new bucket size to $2^m{}_{new}$; and
    computing a new range for the new set of buckets.

5. A system for computing statistics for a population comprising:
  a) a distribution database comprising a set of buckets of received values of a sample of the population;
  b) a program stored on a storage media which, when executed by a processor:
  performs initialization of the distribution database wherein initialization comprises:
    computing a value $X=V/N$ where V is a value in the population and N is a quantity of buckets in the distribution database;
    computing a value $2^m$ based on the value X, wherein $2^{m-1}$ is less than X and $2^m$ is greater than or equal to X;
    computing an initial range for the set of buckets, comprising:
      selecting a minimum value of the initial range, wherein the minimum value is selected by one of a user and the processor; and
      computing a maximum value of the initial range where the maximum value=$((N\cdot 2^m)+($minimum value$-1))$;
    setting an initial size of each bucket to $2^m$;
  places the value V and new values in the set of buckets based on the initial range and the initial size of the set of buckets; and
  computes percentile information based on the value V and the new values in the set of buckets, wherein the value V and the new values relate to time measurements in a network.

6. The system as recited by claim 5, wherein the percentile information comprises:
  a value at a given percentile; and
  a percentile for a value.

7. The system as recited in claim 5 wherein the time measurements represent the time it takes for a packet to travel from a device through the network to another device and back.

8. A machine-readable medium having embodied thereon a program, the program being executable by a machine to perform method steps for computing percentiles for values in a population and values for percentiles of a population, the method comprising the steps of:
  maintaining at least one set of buckets containing values as values are received by a processing system, maintaining comprising:
    initializing the set of buckets, initializing comprising:
      computing a value $X=V/N$ where V is a value in the population and N is a quantity of buckets in the set of buckets, wherein N is selected by one of a user and the processing system;
      computing a value $2^m$ based on the value X, wherein $2^{m-1}$ is less than X and $2^m$ is greater than or equal to X;
      computing an initial range for the set of buckets, comprising:
        selecting a minimum value of the initial range, wherein the minimum value is selected by one of a user and the processing system; and
        computing a maximum value of the initial range where the maximum value=$((N\cdot 2^m)+($minimum value$-1))$;
      computing an initial size for each of the N buckets in the set of buckets, wherein the initial size is set to $2^m$; and
      placing the value V and new values in the set of buckets based on the initial range and the initial size of the buckets; and
  computing percentiles for values and values for percentiles based on the values in the buckets, wherein the value V and the new values relate to time measurements in a network.

9. The machine-readable medium of claim 8, the program being executable to perform method steps further comprising the step of:
  redistributing the values to a new set of buckets upon reception of a value $V_{new}$ not within the initial range of the buckets, redistributing comprising:
    determining a configuration for the new set of buckets, comprising the steps of:
      computing a value $X_{new}$ where $X_{new}=V_{new}/N$;
      computing a value $2^m{}_{new}$ where $2^{m-1}{}_{new}$ is less than $X_{new}$ and $2^m{}_{new}$ is greater than or equal to $X_{new}$;
      setting a new size bucket size to $2^m{}_{new}$; and
      computing a new range of values for the new set of buckets.

* * * * *